(12) United States Patent
Sutehall et al.

(10) Patent No.: US 9,977,210 B2
(45) Date of Patent: May 22, 2018

(54) HIGH FIBRE COUNT BLOWN OPTICAL FIBRE UNIT AND METHOD OF MANUFACTURING

(71) Applicant: PRYSMIAN S.P.A., Milan (IT)

(72) Inventors: Ralph Sutehall, Milan (IT); Mark Richard Mason, Milan (IT)

(73) Assignee: PRYSMIAN S.P.A., Milan (IT)

(*) Notice: Subject to any disclaimer, the term of this patent is extended or adjusted under 35 U.S.C. 154(b) by 0 days. days.

(21) Appl. No.: 15/028,617

(22) PCT Filed: Oct. 15, 2013

(86) PCT No.: PCT/EP2013/071464
§ 371 (c)(1),
(2) Date: Apr. 11, 2016

(87) PCT Pub. No.: WO2015/055229
PCT Pub. Date: Apr. 23, 2015

(65) Prior Publication Data
US 2016/0252693 A1    Sep. 1, 2016

(51) Int. Cl.
*G02B 6/44* (2006.01)

(52) U.S. Cl.
CPC ........... *G02B 6/4438* (2013.01); *G02B 6/449* (2013.01); *G02B 6/4413* (2013.01); *G02B 6/4434* (2013.01); *G02B 6/4464* (2013.01)

(58) Field of Classification Search
CPC .... G02B 6/4494; G02B 6/441; G02B 6/4429; G02B 6/443; G02B 6/4433
See application file for complete search history.

(56) References Cited

U.S. PATENT DOCUMENTS

| 4,997,256 A | 3/1991 | Sano et al. |
| 5,109,456 A | 4/1992 | Sano et al. |
| 5,555,335 A | 9/1996 | Barker et al. |

(Continued)

FOREIGN PATENT DOCUMENTS

| EP | 0 521 710 | 1/1993 |
| EP | 0 646 818 | 4/1995 |

(Continued)

OTHER PUBLICATIONS

International Search Report from the European Patent Office for International Application No. PCT/EP2013/071464, dated Feb. 26, 2014.

(Continued)

*Primary Examiner* — Jennifer Doan
(74) *Attorney, Agent, or Firm* — Finnegan, Henderson, Farabow, Garrett & Dunner, L.L.P.

(57) ABSTRACT

An optical fiber unit for air-blown installations includes a plurality of optical fiber sub-units and a central member, wherein the optical fiber sub-units are stranded around the central member; wherein each of the optical fiber sub-units includes a number of optical fibers, an inner layer which is radially outer to the optical fibers, and an outer layer which is radially outer to the inner layer, wherein the outer layer includes particulate material which is partially embedded into the outer layer; and wherein the optical fiber unit further includes a binder for keeping the stranded optical fiber sub-units in a proper arrangement.

16 Claims, 6 Drawing Sheets

(56) References Cited

U.S. PATENT DOCUMENTS

| | | | |
|---|---|---|---|
| 5,557,703 A | 9/1996 | Barker et al. | |
| 6,249,628 B1 * | 6/2001 | Rutterman | G02B 6/4495 |
| | | | 385/100 |
| 8,565,565 B2 * | 10/2013 | Barrett | G02B 6/4413 |
| | | | 385/106 |
| 2005/0094953 A1 | 5/2005 | Park et al. | |
| 2008/0260340 A1 | 10/2008 | Park | |
| 2014/0023330 A1 * | 1/2014 | Blew | G02B 6/4436 |
| | | | 385/113 |

FOREIGN PATENT DOCUMENTS

| | | |
|---|---|---|
| KR | 10-2006-0002685 | 1/2006 |
| WO | WO 2006/025645 | 3/2006 |

OTHER PUBLICATIONS

Written Opinion of the International Searching Authority from the European Patent Office for International Application No. PCT/EP2013/071464, dated Feb. 26, 2014.

* cited by examiner

HIGH FIBRE COUNT BLOWN OPTICAL FIBRE UNIT AND METHOD OF MANUFACTURING

CROSS REFERENCE TO RELATED APPLICATION

This application is a national phase application based on PCT/EP2013/071464, filed Oct. 15, 2013, the content of which is incorporated herein by reference.

BACKGROUND

The present invention relates to optical fibre units for air-blown installations. More in particular, the present invention relates to a high fibre count blown optical fibre unit. The present invention also relates to a method of manufacturing such a blown optical fibre unit.

PRIOR ART

Fiber optic cables have been commonly deployed by installing them in ducts by blowing or pulling, burying them in the ground, or suspending them between above-ground poles.

Optical microcabling technology has been introduced for the deployment of fiber optic cables to increase use of the conduit space and to enhance profitability of the current (and/or future) telecommunications infrastructure. This technology involves the use of standard inner ducts in which microducts are jetted, followed by the jetting of microduct cables or microcables into the microducts when required. Although originally intended for business access networks (FTTB) and fiber-to-the-home (FTTH), this technology has been used successfully in long-haul applications as well.

Microducts are empty tubes of small outer/inner diameter (e.g., generally in the range of 5/3.5 millimeters to 12/10 millimeters) that can be blown or pushed into empty or partially filled standard ducts. Optical fiber units, specifically designed for this kind of application, are then installed as needed inside the microduct tubes by blown installation techniques.

In known blown optical fibre units, a number of coated optical fibers (for example, four, in bundles or ribbon, but also a single optical fibre) are contained within a soft inner layer enclosed in an outer harder layer. In the outer harder layer particulate material (typically hollow or solid glass beads) is embedded.

EP 0 521 710 discloses an optical fibre package suitable for blown installation and a method of making an optical fibre package for blown installation in a continuous process.

EP 0 646 818 discloses an optical fibre assembly for blown installation, comprising a fibre unit comprising at least one optical fibre. The unit has a coating comprising an external layer of a material containing hollow glass beads at least some of which project from the outer surface of said external layer. The coating also has an inner, buffer layer of a material having a lower modulus of elasticity than that of said material of the external layer and an intermediate layer of material disposed between said external and inner layers.

U.S. Pat. No. 4,997,256 discloses an optical fiber unit to be installed by the drag force of a pressure fluid flowing through a pipe, which optical fiber unit comprises at least one optical fiber and more than one interstitial cord which are bundled and surrounded by an inner sheath and an outer sheath to provide a unitary assembly, which inner sheath is formed of a resin that has a high Young's modulus and that will exhibits small residual strain during the application of sheathing and which outer sheath is made of a foamed polyethylene.

U.S. Pat. No. 5,109,456 discloses an optical fiber unit which is suitable for use in a laying method of a fluid pressure-sending system such as an air blown fiber method or other such systems.

SUMMARY OF THE INVENTION

With the increase in demand and complexity for blown fibre systems, customers are now requesting an increase in the maximum number of optical fibers that can be installed into a blown fibre micro-duct. At present, the maximum is twelve and requests are being made to increase this to twenty four.

The major problem with this is that an increase in fibre quantity will result in an increase in the diameter of the blown optical fiber unit.

The Applicant has realized that an increase of the diameter of the blown optical fiber unit will result in a decrease in the maximum blowing distance due to the subsequent reduction in airflow and in an increase in stiffness and weight of the blown optical fiber unit.

The Applicant has faced the problem of providing a blown optical fibre unit comprising a high number of optical fibers while providing a good blowing performance.

The Applicant has realized that a good blowing performance is obtained when at least one of outer diameter, weight and stiffness is maintained at a low value.

In particular, for the same inner diameter of the microduct within which a blown optical fiber unit must be blown, the smaller the diameter of the optical unit, the higher the blown installation performance. In other words, if the diameter of the optical unit is small, longer blowing distances could be reached. On the contrary, if the diameter of the optical unit is large, the air flow is reduced and the optical unit can be installed only along a relatively short distance.

Stiffness affects the ability for the optical unit to be blown through routes containing numerous bends.

In a first attempt to solve the above problem of providing a high fiber count blown optical fiber unit with good blowing performance, the Applicant has considered manufacturing a 24 fiber units by laying-up, in a parallel formation, four sub-units (which each sub-unit comprising 6 fiber units) and coating them with an acrylate resin having at least partially embedded particulate material. However, the Applicant has experienced that this would result in a fibre unit stiffness in excess of about 48 E-5 $Nm^2$. This stiffness would affect the ability for the fibre to be blown through routes containing numerous bends.

As used herein unit stiffness is measured in accordance with IEC60794-1-2, method E17C.

The Applicant found that a high fiber count blown optical fibre unit with good blowing performance can be obtained by providing a plurality of stranded sub-units (possibly in a SZ formation) around a strength member. Each sub-unit comprises a number of optical fibers contained within a soft inner layer enclosed in an outer harder layer wherein particulate material is at least partially embedded.

According to a first aspect, the present invention provides an optical fiber unit for air-blown installations comprising a plurality of optical fiber sub-units and a central member, wherein the optical fiber sub-units are stranded around the central member;

wherein each of the optical fiber sub-units comprises a number of optical fibers, an inner layer which is radially outer to the optical fibers and an outer layer which is radially outer to the inner layer, wherein the outer layer comprises particulate material which is partially embedded into the outer layer; and wherein the optical fiber unit further comprises a binder for keeping the stranded optical fiber sub-units in a proper arrangement.

Preferably, the optical fiber sub-units are stranded around the central member in a SZ formation.

According to embodiments, the optical fiber sub-units are stranded around the central member by a lay length between about 250 mm and about 500 mm.

The binder may comprise an elongate member which is helically continuously wound in one direction around the stranded optical fiber sub-units or it may comprise an elongate member which is helically continuously wound in two opposite directions so that a crossed arrangement is obtained.

The binder may comprise a binder tape. Preferably, the binder tape covers from about 15% to about 50% of the outer surface of said optical fiber unit.

The optical fiber unit, in preferred embodiments, may comprise four optical fiber sub-units, with each optical fiber sub-unit comprising six optical fibers.

The optical fiber unit may also comprise additional fillers. The additional fillers may be stranded around the central member.

According to a second aspect, the present invention provides a method of manufacturing an optical fiber unit for air-blown installations, the method comprising:

providing a plurality of optical fiber sub-units and a central member, wherein each of the optical fiber sub-units comprises a number of optical fibers, an inner layer which is radially outer to the optical fibers and an outer layer which is radially outer to the inner layer, wherein the outer layer comprises particulate material which is partially embedded into the outer layer;

stranding the optical fiber sub-units around the central member; and binding the stranded optical fiber sub-units in a proper arrangement.

Preferably, the step of stranding may comprise stranding the optical fiber sub-units around the central member in a SZ formation.

According to embodiments, the step of stranding comprises stranding by a lay length between 250 mm and 500 mm.

The step of binding may comprise winding an elongate member helically continuously in one direction around the stranded optical fiber sub-units or it may comprise winding an elongate member helically continuously in two opposite directions around the stranded optical fiber sub-units so that a crossed arrangement is obtained.

The step of binding may comprise winding a binder tape.

BRIEF DESCRIPTION OF THE DRAWINGS

The present invention will become more clear from the detailed following description, given by way of example and not of limitation, with reference to the following figures, wherein.

DESCRIPTION OF EXAMPLES

Figure 1:
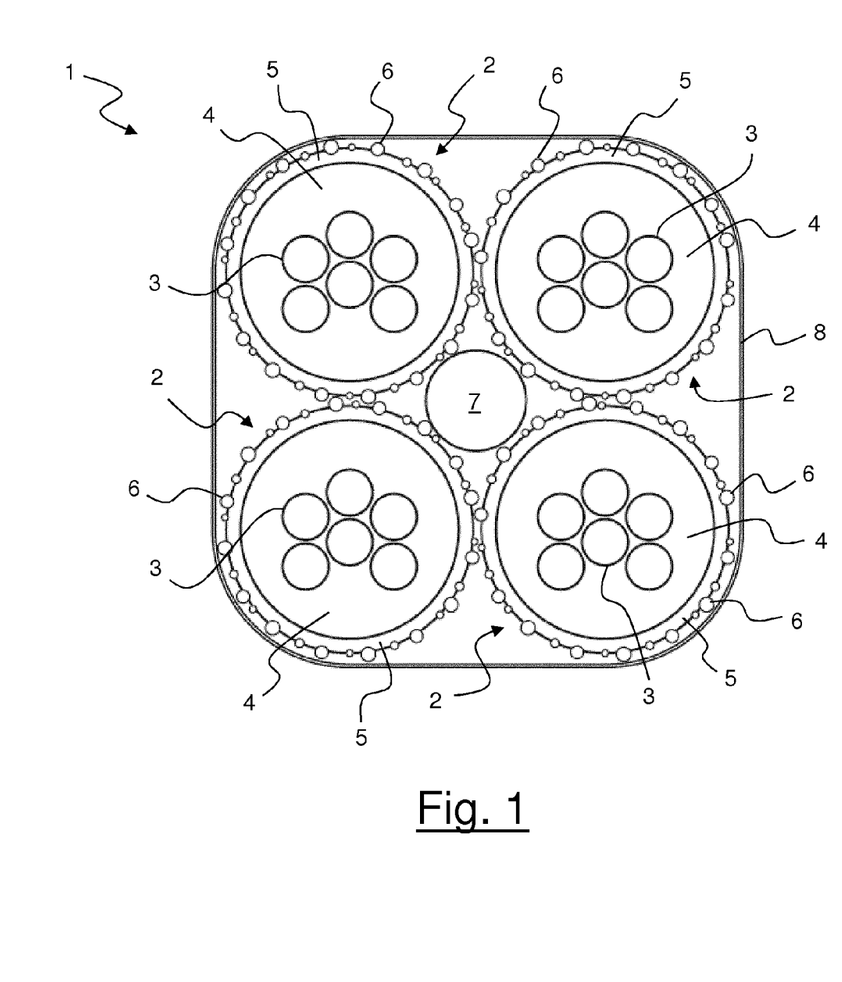
FIG. 1 is a schematic cross-section of a blown optical fibre unit according to a first example of the present invention.

FIG. 1 represents a schematic cross-section of a blown optical fibre unit 1 according to a first example of the present invention.

The optical fiber unit 1 comprises a plurality of optical fiber sub-units 2. In the example of FIG. 1 four optical fiber sub-units 2 are provided. However, in other examples (not shown) the number of optical fiber sub-units 2 could be higher or lower than four.

Preferably, each of the optical fiber sub-units 2 is substantially as the other optical fiber sub-units. However, within the scope of protection of the present invention are also examples wherein the sub-units differ in terms of, for instance, number of optical fibers, outer diameter, material of the outer layer and surface coverage of the particulate material.

Each of the optical fiber sub-units 2 preferably comprises a number of optical fibers 3, an inner layer 4 which is radially outer to the optical fibers 3 and an outer layer 5 which is radially outer to the inner layer 4. The outer layer 5 comprises particulate material 6 which is partially embedded into the outer layer.

The term "optical fibre" is meant to indicate an optical glass core surrounded by a glass cladding and a coating system comprising one or two layers of cured resins, for example acrylate resins. The optical fibers may be single mode or multimode optical fibers with a nominal diameter between about 200 µm and 250 µm. Relative to each other, the optical fibers may have a length difference of less than about 0.03%. The optical fibers generally extend in a longitudinal direction but have no fixed position relative to inner layer 4.

Each optical fiber sub-units 2 of the example of FIG. 1 comprises six optical fibers. In other examples (not shown), there are provided more than six optical fibers. In other examples (not shown), there are provided less than six optical fibers.

Particulate material 6 can comprise any material which provides low friction when the optical fibre unit 1 is blown in a duct or micro-duct.

For example, the particulate material 6 could be selected among beads of glass, of ceramic, of polytetrafluoroethylene (PTFE) or of high-density polyethylene (HDPE). The beads can be either hollow or solid. The beads may have a diameter of from 0.070 mm to 0.150 mm.

The particle material coverage—i.e. the amount of beads per unit surface area of the product—in the optical fibre sub-unit 2 can be of from 15 to 35 beads/mm$^2$.

The embedding is the amount of sinking of the particles into the outer layer 5, expressed as percentage of the particle dimension which is embedded into the outer layer. According to examples of the invention, the embedding of the particle material is of from 20% to 70%, preferably from 20% to 60%. The embedding should be high enough to maintain the particle fixed into the outer layer, but not too much so as to compromise the surface roughness parameter.

As a matter of fact, a relatively high surface roughness reduces the friction between the optical fiber unit and the duct during the blowing procedure and increases the ability of the optical fiber unit to be entrained by the air blowing.

As said above, inner layer 4 is arranged radially outer to the optical fibers 3. Profitably, inner layer 4 comprises a layer of cured resin such as, for instance, acrylate resin. The diameter of inner layer 4 could be in a range between 0.6 mm and 1.3 mm, preferably between 0.8 mm and 1.2 mm. Example of a material for the inner layer 4 is Cabelite 3287-9-39A from DSM Desotech.

Outer layer 5 is radially outer to the inner layer 4. Profitably, outer layer 5 comprises a layer of cured resin such as, for instance, acrylate resin. The outer diameter of outer layer 5 could be in a range between 0.7 mm and 2 mm, preferably between 1.0 mm and 1.4 mm. Outer layer 5 is generally harder than inner layer 4. Example of a material for the outer layer 5 is Cabelite 3287-9-75 from DSM Desotech.

With further reference to FIG. 1, the optical fiber unit 1 further comprises a central member 7. Such central member 7 could be any of a glass reinforced plastic filler, a water swellable yarn or a strength member, possibly made of aramid or the like. Advantageously, central member 7 has a diameter in a range between 0.4 mm and 1.0 mm, preferably between 0.5 mm and 0.7 mm.

Figure 2:
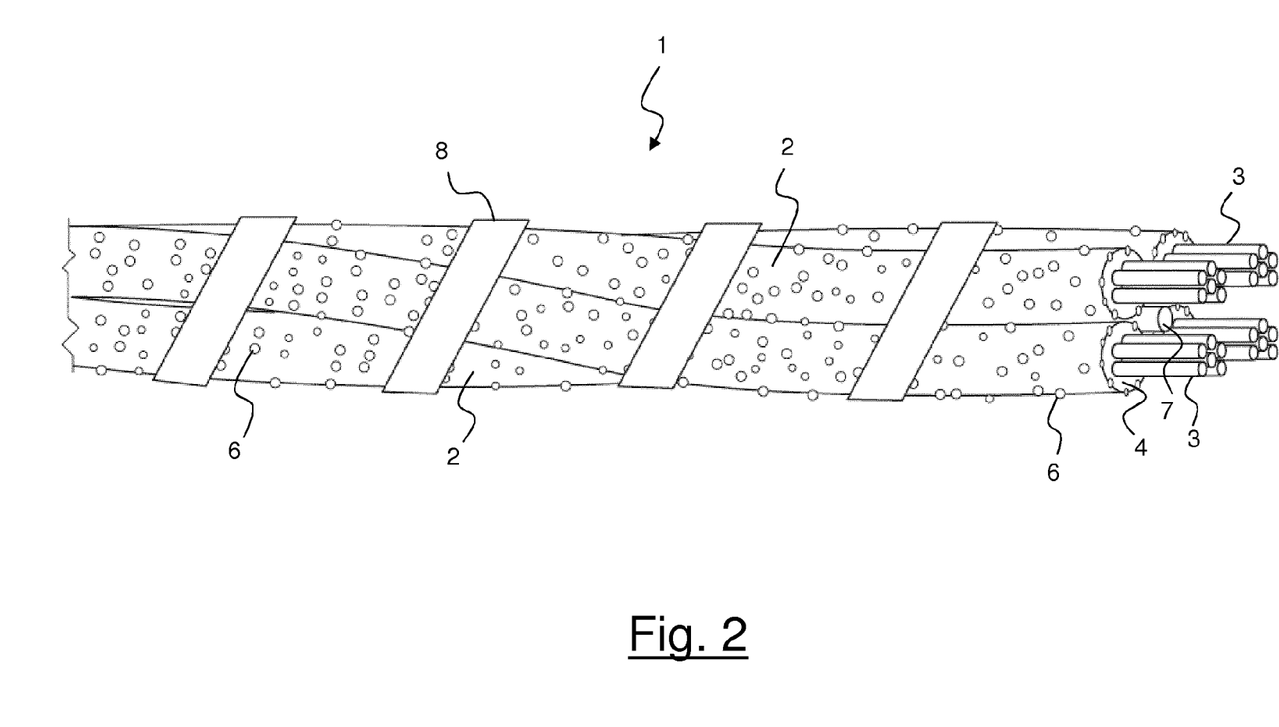
FIG. 2 shows a length of the cable of FIG. 1 with a first type of binder.
Figure 3:
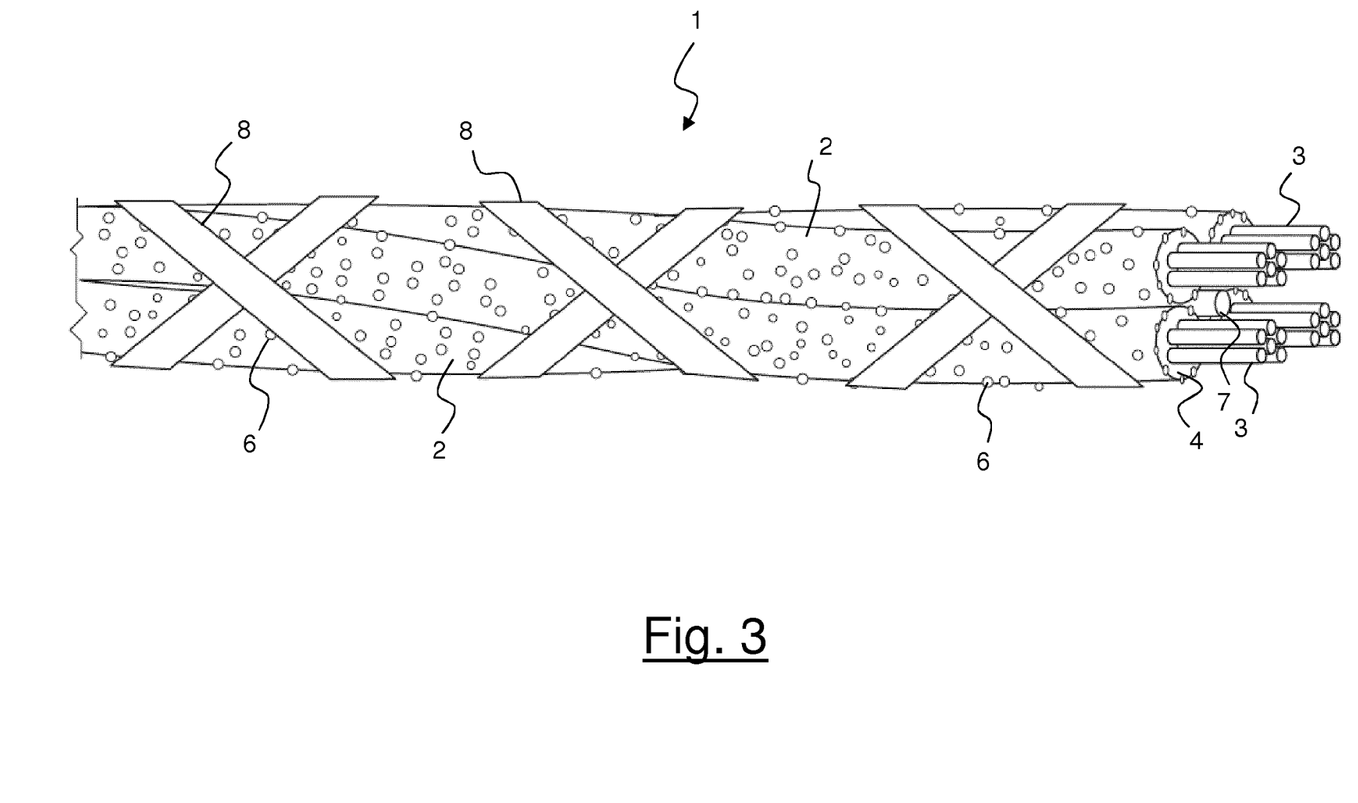
FIG. 3 shows a length of the cable of FIG. 1 with a second type of binder.

According to an example of the present invention, the optical fiber sub-units 2 and the central member are stranded together. Stranding could be in a S formation. More preferably, the optical fiber sub-units 2 are stranded around the central member 7 in a SZ formation. Such arrangement is shown in FIGS. 2 and 3. The SZ stranding results in a stiffness reduction of the blown optical unit which, in turn, improves blowing performance.

In case of a SZ stranding pattern, the optical fiber sub-units 2 are wound around the central member 7 in a first direction for one or several turns and then are wound around the central member for a corresponding number of turns in the opposite direction. The optical fiber sub-units 2 are wound around the central member 7 by a lay length between 250 mm and 500 mm. A typical lay length is about 300 mm.

With further reference to FIG. 1, preferably the blown optical fiber unit 1 preferably comprises a binder 8 around the assembly comprising the optical fiber sub-units 2 wound around the central member 7.

In examples of the invention, such binder 8 comprises an elongate member such as a binder yarn, a binder thread, a binder tape or the like.

FIG. 2 shows a binder tape 8 wrapped around the assembly comprising the optical fiber sub-units 2 wound around the central member 7.

In examples of the invention, binder tape 8 can be made of polyester, paper or the like. The binder tape 8 may be about 0.10 mm thick and about 30 mm large.

Preferably, binder tape 8 is helically wound around the assembly comprising the optical fiber sub-units 2 wound around the central member 7.

In a first example, shown in FIG. 2, one single binder tape 8 is helically continuously wound in one direction.

In a second example, shown in FIG. 3, two binder tapes 8 are helically continuously wound in two opposite directions so that a crossed arrangement is obtained. This second example keeps the package more tight.

In any case, according to preferred examples of the invention, the binder tape(s) does/do not cover the entire outer surface of the assembly. This in order not to cover all the particle material (beads) projecting from the harder outer layer. Preferably, the binder tape(s) is/are arranged in such a way that from about 15% to 50% of the outer surface becomes covered.

Examples of optical fiber units according to the invention are:

i) 2.4 mm diameter 24 fiber unit consisting of 4 subunits with 6 optical fibers having a weight of about 4.0 g/m and a stiffness of about 26.3 E-5 $Nm^2$. The Applicant has found that such unit can be blown with good performance in ducts with a minimum inner diameter of 4.0 mm, without getting stuck in bends.

ii) 3.0 mm diameter 48 fiber unit consisting of 4 subunits with 12 optical fibers having a weight of about 9 g/m and a stiffness of about 75 E-5 $Nm^2$. The Applicant has found that such unit can be blown with good performance in ducts with an minimum inner diameter of 5.0 mm, without getting stuck in bends.

iii) 4.3 mm diameter 72 fiber unit consisting of 6 subunits with 12 optical fibers having a weight of about 14 g/m and a stiffness of about 100 E-5 $Nm^2$. The Applicant has found that such unit can be blown with good performance in ducts with a minimum inner diameter of 6.0 mm, without getting stuck in bends.

iv) 5.3 mm diameter 96 fiber unit consisting of 8 subunits with 12 optical fibers having a weight of about 18 g/m and a stiffness of about 150 E-5 $Nm^2$. The Applicant has found that such unit can be blown with good performance in ducts with a minimum inner diameter of 8.0 mm, without getting stuck in bends.

Comparative mini cables with equal fiber counts would have diameters and weights of 5.0 mm and 22 g/m for a 24, 48 or 72 fiber unit, with a stiffness of about 0.5 $Nm^2$. A 96 fiber count mini cable would have a diameter of 5.8 mm, a weight of 32 g/m and a stiffness of about 1 $Nm^2$.

Examples of fiber types which can be used in the units according to the invention are:
Standard singlemode Fibre (SSMF) compliant with ITU-T Recommendation G.652, Table B)
Enhanced singlemode Fibre (ESMF) compliant with ITU-T Recommendation G.652, Table D)
bend insensitive single mode fiber (BI-SMF) compliant with ITU-T Recommendation G.652, Table D and ITU-T Recommendation G. 657
Graded index multimode fiber Such optical fibers are typically provided with a dual layer protective coating with a diameter of about 245 µm. Alternatively, reduced diameter fibers could be used, with typical diameter (of the fiber with coating) between 190 and 210 µm. This allows for a further reduction of the subunit diameter and hence the whole outer diameter of the unit.

Figure 4:
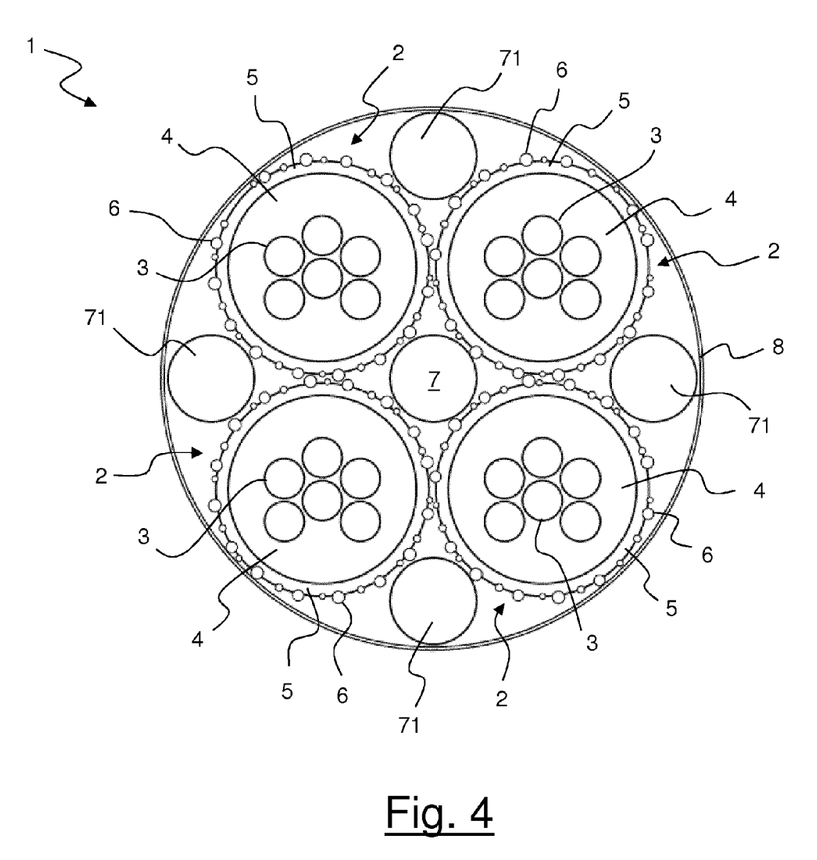
FIG. 4 is a schematic cross-section of a blown optical fibre unit according to a second example of the present invention.
Figure 5:
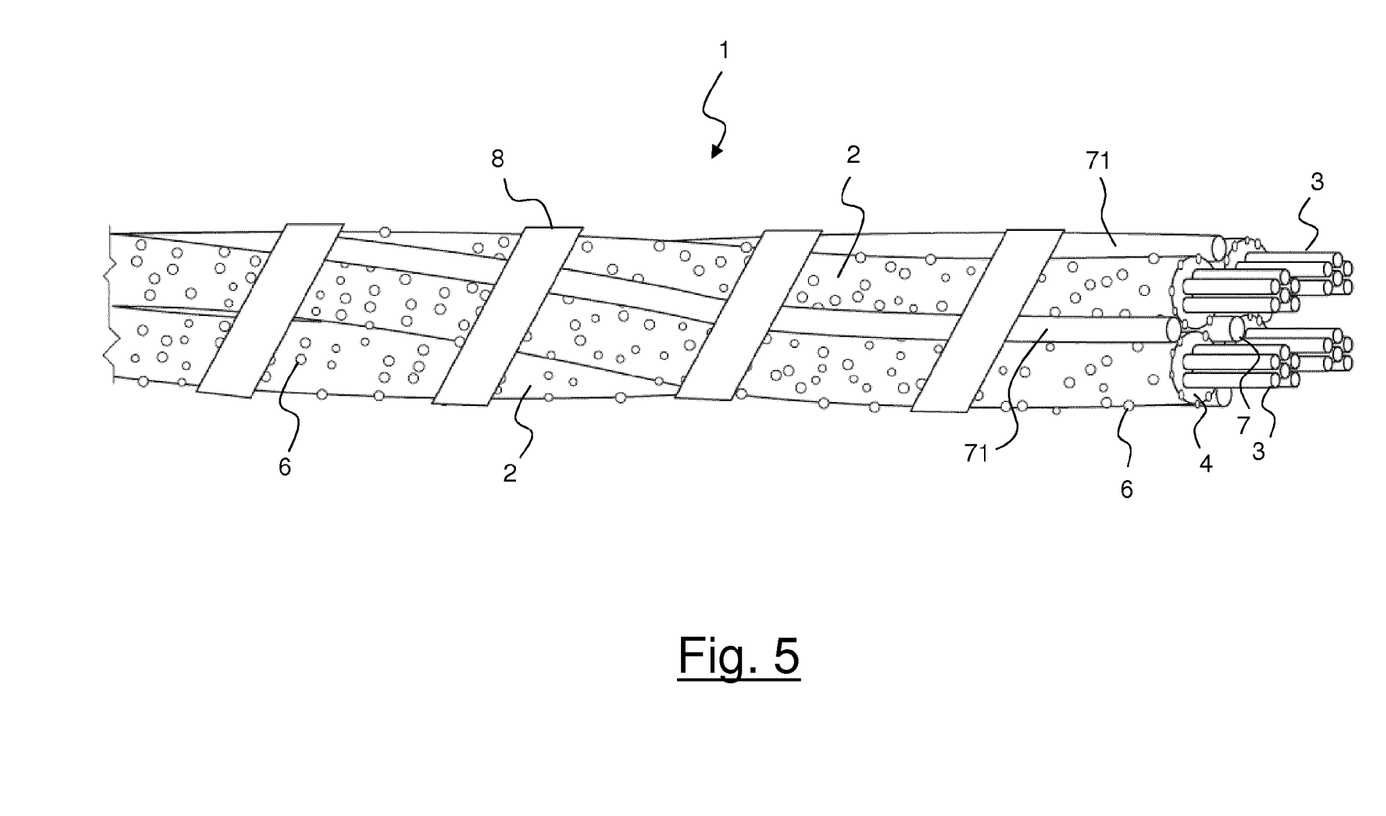
FIG. 5 shows a length of the cable of FIG. 4 with a first type of binder.
Figure 6:
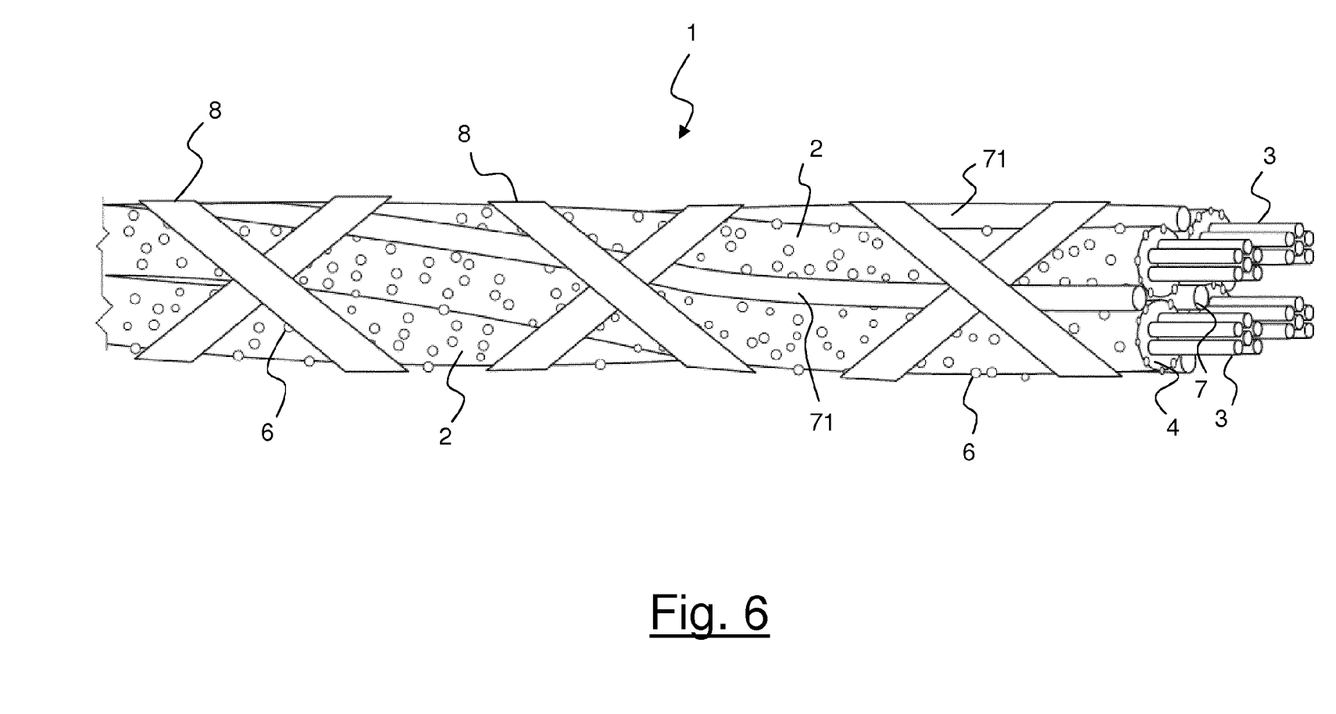
FIG. 6 shows a length of the cable of FIG. 4 with a second type of binder.

Reference is now made to FIGS. 4, 5 and 6 which show a second example of the present invention. Indeed, the second example has several similarities with the first example and a full detailed description will be omitted. The same reference signs will be used for indicating the same part or a technically equivalent component.

Briefly, the optical fiber unit 1 of the second example comprises a plurality of optical fiber sub-units 2. Each of the optical fiber sub-units 2 comprises a number of optical fibers 3, an inner layer 4 which is radially outer to the optical fibers 3 and an outer layer 5 which is radially outer to the inner layer 4. The outer layer 5 comprises particulate material 6 which is partially embedded into the outer layer.

The optical fiber unit 1 of the second example further comprises a central member 7. Such central member 7 could be any of a glass reinforced plastic filler, a water swellable yarn or a strength member, possibly made of aramid or the like. Advantageously, central member 7 has a diameter in a range between 0.4 mm and 1.0 mm, preferably between 0.5 mm and 0.7 mm.

As can be inferred from a comparison between FIG. 1 and FIG. 4, the blown optical fiber unit 1 of the second example further comprises additional fillers 71. Preferably, an additional filler is arranged between two optical fiber sub-units 2. Therefore, with four optical fiber sub-units 2, four additional fillers 71 are provided.

The presence of additional fillers 71 improves the circularity of the optical fiber unit 1. Additional fillers 71 could be in the form of polymeric or water swellable yarns. Additional fillers are stranded together with optical fiber sub-units 2.

The Applicant has conducted test trials confirming the good performance of the optical fiber unit according to the invention.

A 24f epfu (wherein "epfu" stands for enhanced performance fiber optical unit and "24f" stands for 24 fibers), having a diameter of about 2.4 mm and consisting of 4 times a 6f epfu (1.1 mm diameter) SZ stranded around a central aramid or polyester member (0.5 mm diameter) and surrounded by a helical wrapped binder yarn, providing a coverage of 50% was blown into 500 m of 5.5 mm bore micro-ducting wound onto a drum at a constant speed of about 25 m/min at a blowing pressure of about 10 bar. Blowing performance is indicated in Table 1 below.

TABLE 1

Blowing Performance

| Distance [m] | Speed [m/min] | Time [min] |
|---|---|---|
| 0 | 0 | 0.00 |
| 50 | 25 | 2.10 |
| 100 | 25 | 4.12 |
| 150 | 25 | 6.12 |
| 200 | 25 | 8.12 |
| 250 | 24 | 10.16 |
| 300 | 23 | 12.25 |
| 350 | 20 | 14.30 |
| 400 | 25 | 16.35 |
| 450 | 25 | 18.35 |
| 500 | 25 | 20.35 |

In the blown optical fiber unit 1 according to the present invention the optical fibers could be replaced by conventional loose tube packages or plastic coated blown fibre units, comprising a number of optical fibers (for instance 3+9 optical fibers), an inner sheath and an outer sheath.

According to a second aspect, the present invention provides a method of manufacturing a blown optical fibre unit 1. The method comprises:
providing a plurality of optical fiber sub-units and a central member, wherein each of said optical fiber sub-units comprises a number of optical fibres, an inner layer which is radially outer to the optical fibers and an outer layer which is radially outer to the inner layer, wherein the outer layer comprises particulate material which is partially embedded into the outer layer;
stranding said optical fiber sub-units around said central member;
binding said stranded optical fiber sub-units in a proper arrangement.

The invention claimed is:

1. An optical fiber unit for air-blown installations comprising a plurality of optical fiber sub-units and a central member,
wherein said optical fiber sub-units are stranded around said central member;
wherein each of said optical fiber sub-units comprises a number of optical fibres, an inner layer which is radially outer to the optical fibres, and an outer layer which is radially outer to the inner layer, and
wherein the outer layer comprises particulate material which is partially embedded into the outer layer; and
wherein said optical fiber unit has an outer surface and further comprises a binder for keeping said stranded optical fiber sub-units in a proper arrangement, wherein said binder covers at least a portion of the outer surface of said optical fiber unit and is the outermost layer of said optical fiber unit where present.

2. The optical fiber unit of claim 1, wherein said optical fiber sub-units are stranded around said central member in a SZ formation.

3. The optical fiber unit of claim 2, wherein said optical fiber sub-units are stranded around said central member by a lay length between 250 mm and 500 mm.

4. The optical fiber unit of claim 1, wherein said binder comprises an elongate member helically continuously wound in one direction around said stranded optical fiber sub-units.

5. The optical fiber unit of claim 1, wherein said binder comprises an elongate member helically continuously wound in two opposite directions so that a crossed arrangement is obtained.

6. The optical fiber unit of claim 4, wherein said binder comprises a binder tape.

7. The optical fiber unit of claim 6, wherein said binder tape covers about 15% to 50% of the outer surface of said optical fiber unit.

8. The optical fiber unit of claim 1, wherein said optical fiber unit comprises four optical fiber sub-units, each optical fiber sub-unit comprising six optical fibers.

9. The optical fiber unit of claim 1, wherein said optical fiber unit further comprises additional fillers.

10. The optical fiber unit of claim 9, wherein said additional fillers are stranded around said central member.

11. A method of manufacturing an optical fiber unit for air-blown installations, comprising:
providing a plurality of optical fiber sub-units and a central member, wherein each of said optical fiber sub-units comprises a number of optical fibres, an inner layer which is radially outer to the optical fibres and an outer layer which is radially outer to the inner layer, wherein the outer layer comprises particulate material which is partially embedded into the outer layer;
stranding said optical fiber sub-units around said central member; and binding said stranded optical fiber sub-units in a proper arrangement, wherein said optical fiber unit has an outer surface and wherein said binding covers at least a portion of the outer surface of said optical fiber unit and is the outermost layer of said optical fiber unit.

12. The method of claim 11, wherein said stranding comprises stranding said optical fiber sub-units around said central member in a SZ formation.

13. The method of claim 12, wherein said stranding comprises stranding by a lay length between 250 mm and 500 mm.

14. The method of claim 11, wherein said binding comprises winding an elongate member helically continuously in one direction around said stranded optical fiber sub-units.

15. The method of claim 11, wherein said binding comprises winding an elongate member helically continuously in two opposite directions around said stranded optical fiber sub-units so that a crossed arrangement is obtained.

16. The method of claim 14, wherein said binding comprises winding a binder tape.

* * * * *